(12) United States Patent
Iijima

(10) Patent No.: US 7,036,727 B2
(45) Date of Patent: May 2, 2006

(54) COMMODITY SALES SYSTEM AND METHOD

(75) Inventor: Junichi Iijima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/822,802

(22) Filed: Apr. 13, 2004

(65) Prior Publication Data

US 2004/0188521 A1 Sep. 30, 2004

Related U.S. Application Data

(63) Continuation of application No. PCT/JP01/09654, filed on Nov. 2, 2001.

(51) Int. Cl.
*G06K 15/00* (2006.01)

(52) U.S. Cl. ............... 235/383; 345/738; 345/746; 345/764

(58) Field of Classification Search ............ 235/383; 705/26, 27, 28, 29; 345/738, 746, 764
See application file for complete search history.

(56) References Cited

U.S. PATENT DOCUMENTS

| | | | | |
|---|---|---|---|---|
| 5,724,484 | A | * | 3/1998 | Kagami et al. ............ 706/50 |
| 5,937,081 | A | * | 8/1999 | O'Brill et al. ............ 382/111 |
| 6,029,141 | A | * | 2/2000 | Bezos et al. ............ 705/27 |
| 6,182,871 | B1 | * | 2/2001 | Lam ............ 223/120 |
| 6,629,014 | B1 | * | 9/2003 | Lam ............ 700/130 |
| 6,661,433 | B1 | * | 12/2003 | Lee ............ 715/764 |
| 2002/0026380 | A1 | * | 2/2002 | Su ............ 705/26 |
| 2002/0139846 | A1 | * | 10/2002 | Needham et al. ............ 235/383 |

FOREIGN PATENT DOCUMENTS

| | | |
|---|---|---|
| JP | 10-63725 | 3/1998 |
| JP | 10-91684 | 4/1998 |
| JP | 2860690 | 12/1998 |
| JP | 2001-022831 | 1/2001 |
| JP | 2001-160095 | 6/2001 |
| JP | 2001-229168 | 8/2001 |
| JP | 2001-265851 | 9/2001 |

\* cited by examiner

*Primary Examiner*—Daniel Stcyr
*Assistant Examiner*—Daniel A. Hess
(74) *Attorney, Agent, or Firm*—Staas & Halsey LLP

(57) ABSTRACT

To perform sales cooperation among a plurality of stores constituting, for example, a shopping center, a street of stores, or the like. To enable this cooperation, a clerk in each store proposes, to a customer in the store, coordinated commodities in which a commodity for sale in the original store is combined with a commodity for sale in another store. According to the proposal, when the customer comes to the other store introduced by the clerk in the original store and purchases the commodity for sale in the other store, a system is provided so that the original store having introduced the other store can receive a sales commission from the store introduced by the original store. Further, preferably, a system is provided so that the customer can purchase the commodity for sale in the other store at a predetermined discount price.

15 Claims, 9 Drawing Sheets

FIG. 3(a) [Background File]

| NO | Scene Name | Image Data |
|---|---|---|
| 101 | Ski Area 1 | Ski Area 1.jpg |
| 102 | Ski Area 2 | Ski Area 2.jpg |
| 201 | Seaside 1 | |
| 202 | Seaside 2 | |
| 301 | Town 1 | |
| 303 | Town 2 | |

FIG. 3(b) [Coordinate Information File]

| NO | Commodity Name | Feature | Image Data | Extraction Keyword | Cooperating Store | Coordinate No. | Background No. |
|---|---|---|---|---|---|---|---|
| 1101 | T Shirt Blue | Excellent Moisture Absorption | T Shirt Blue.jpg | | Boutique Fujitsu | 5201 | 301 |
| 1102 | T Shirt White | | T Shirt White.jpg | Fashion Of This Ye | Boutique Fujitsu | 5102 | 302 |
| 2101 | Ski Suit Red | | Ski Suit Red.jpg | Discount Item | Optician's Shop | 6101 | 101 |

FIG. 3(c) [Commodity Information File]

| NO | Commodity Name | Feature | Image Data | Store Name | Sales Price | Discount Rate | Commission Rate | Stock |
|---|---|---|---|---|---|---|---|---|
| 1101 | T Shirt Blue | Excellent Moisture Absorption | T Shirt Blue.jpg | FJ Shop | 2000 | 5% | 1.0% Of The Price | 10 |
| 1102 | T Shirt White | | T Shirt White.jpg | FJ Shop | 2500 | 5% | 1.0% Of The Price | 5 |
| 2101 | Ski Suit Red | | Ski Suit Red.jpg | FJ Shop | 35000 | 20% | 5.0% Of The Price | 2 |
| 5102 | Skirt Flower Pattern | Wrinkle-Free | Skirt Flower Pattern.jpg | Boutique Fujitsu | 12000 | 5% | 5.0% Of The Price | 1 |
| 5201 | Culottes Red | | Culottes Red.jpg | Boutique Fujitsu | 6000 | 5% | 1.5% Of The Price | 0 |
| 6101 | Sunglasses | Large UV Process Effect | Sunglasses.jpg | Optician's Shop | 3000 | 3% | 2.0% Of The Price | 20 |

FIG. 3(d) [Commission Management File]

| Original Store | Introduced Store | Introduction No. | Introduction Commodity No. | Introduction SuccessFlag | Payment Flag | Commission | Membership No. |
|---|---|---|---|---|---|---|---|
| FJ Shop | Boutique Fujitsu | 5000-001 | 5201 | 1 | 1 | 600 | 123-456 |
| FJ Shop | Boutique Fujitsu | 5000-002 | 5102 | 0 | 0 | 0 | 0123-456 |
| FJ Shop | Optician's Shop | 6000-001 | 6101 | 1 | 0 | 0 | 0999-888 |

※1=Introduction Succeeded  0=Introduction Not Succeeded
※1=Payment Completed  0=Payment Not Completed

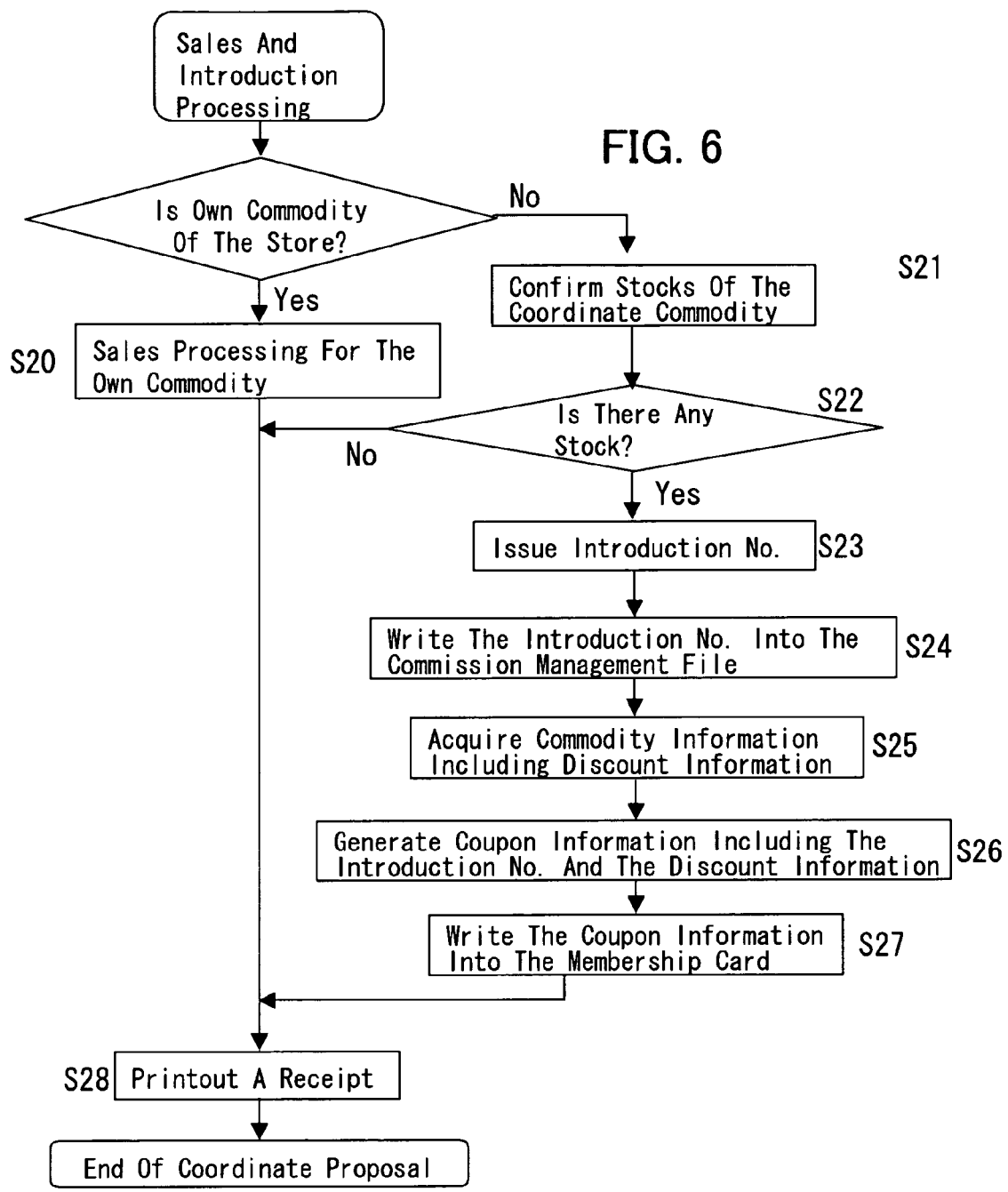

FIG. 7

```
┌─────────────────────────────────────────┐
│  ┌───────────────────────────────────┐  │
│  :        F J   S H O P              :  │
│  └───────────────────────────────────┘  │
│                                         │
│   Thank You Very Much.                  │
│  (Fresh Leaves For Your Eyes, Little    │
│   Cuckoos Singing At Hillside, And Tasty│
│   New Bonito In Season. Nice Season Has │
│   Come!)                                │
│                                         │
│           <Purchase Details>            │
│                                         │
│   July 24, 2001 15:00 Serial Number:0001 0101│
│                                         │
│    1101 T Shirt Blue                    │
│                         1        2,000  │
│   Subtotal              1        2,000  │
│           (Taxable Amount    2,000)     │
│   Tax Rate 5.0%   Consumption Tax, Etc. 100│
│  ─────────────────────────────────────  │
│          Total          2,100           │
│   Membership NO:123-456  Mr. Taro Fujitsu│
│     ☆Coupon Information☆                │
│     5% Discount Available When You Buy A│
│     Skirt -Flower Pattern- At Boutique  │
│     Fujitsu, Showing Your Membership Card.│
│   Staff In Charge: Taro Yamada(01234)   1234│
└─────────────────────────────────────────┘
```

COMMODITY SALES SYSTEM AND METHOD

This application is a continuing application, filed under 35 U.S.C. §111(a), of International Application PCT/JP01/09654, filed Nov. 2, 2001.

FIELD OF THE INVENTION

The present invention relates to a commodity sales system and a method therefor in a plurality of stores constituting department store, shopping center, street of stores, cooperative specialty stores, or the like, and more particularly a commodity sales system and a method enabling sales cooperation among stores.

BACKGROUND OF THE INVENTION

In a shopping center or the like, configured as a set of a plurality of stores, each store usually performs independent business store by store, without sales cooperation among these stores. In general, for example, a store clerk introduces only commodities for sale in the store concerned to customers coming to the store. The store clerk does not introduce to the customers any commodity for sale in the store concerned in combination with commodities in other stores. Also, because the clerk explains and introduces commodities, showing actual commodities, to the customers, it is not possible for the clerk to bring to his store such a commodity for sale in another store, and to introduce this commodity to the customer. Further, even if the clerk introduces the commodity in the other store and the customer purchases this commodity, the sales amount in the original store does not increase. Therefore, the clerk does not conduct such an action of introducing commodities for sale in the other stores.

As such, conventionally, the plurality of stores constituting the shopping center have not conducted sales cooperation although the stores are located in the same shopping center.

SUMMARY OF THE INVENTION

It is an object of the present invention to provide a commodity sales system and a method therefor, enabling sales cooperation among a plurality of stores.

In order to achieve the above-mentioned object, in the commodity sales system according to the present invention, there is prepared coordinate information in which a commodity for sale in the store concerned is combined with a commodity for sale in another store, so as to enable sales cooperation among the plurality of stores. A clerk in each store proposes commodity coordination, in which the commodity for sale in the store concerned is combined with the commodity for sale in the other store, to a customer who came to the store, based on the above-mentioned coordinate information. When the customer comes to the other store (which has been introduced to the customer by the store of interest: hereafter, the other store may also be referred to as 'introduced store'), and purchases the commodity for sale in the other store based on the given proposal, a means is provided such that the store which has introduced the other store to the customer (hereafter, the store of interest may also be referred to as 'original store') can receive a sales commission from the introduced store. Further, preferably, a means is provided so that the customer can purchase the commodity for sale in the other store at a predetermined discount price.

As such, by enabling proposal of commodities for sale in the original store in combination with commodities for sale in the other store, there becomes an increased variation of proposals to the customer in regard to the commodities of the original store, which produces expected sales increase in the original store. Also, because the commodities of the store concerned may be introduced by other stores, sales increase can also be expected in the store concerned. Moreover, when the store concerned introduces a commodity of the other store, and the customer purchases the commodity of the other store according to the given introduction, the original store can receive the sales commission from the introduced store. In such away, by mutually introducing commodities for sale in different stores, sales increase can be expected in each store, which produces a synergy effect on each sales amount.

Further scopes and features of the present invention will become more apparent by the following description of the embodiments with the accompanied drawings.

BRIEF DESCRIPTION OF THE DRAWINGS

FIG. 3 shows explanation diagrams of each file for use in the embodiment of the present invention.

FIG. 6 shows a flowchart of sales and introduction processing performed using a settlement terminal 2.

FIG. 7 shows an example of a receipt on which coupon information is printed.

DETAILED DESCRIPTION OF THE PREFERRED EMBODIMENTS

The preferred embodiment of the present invention is described hereinafter referring to the charts and drawings. However, it is noted that the scope of the present invention is not limited by the embodiments described below.

Figure 1:
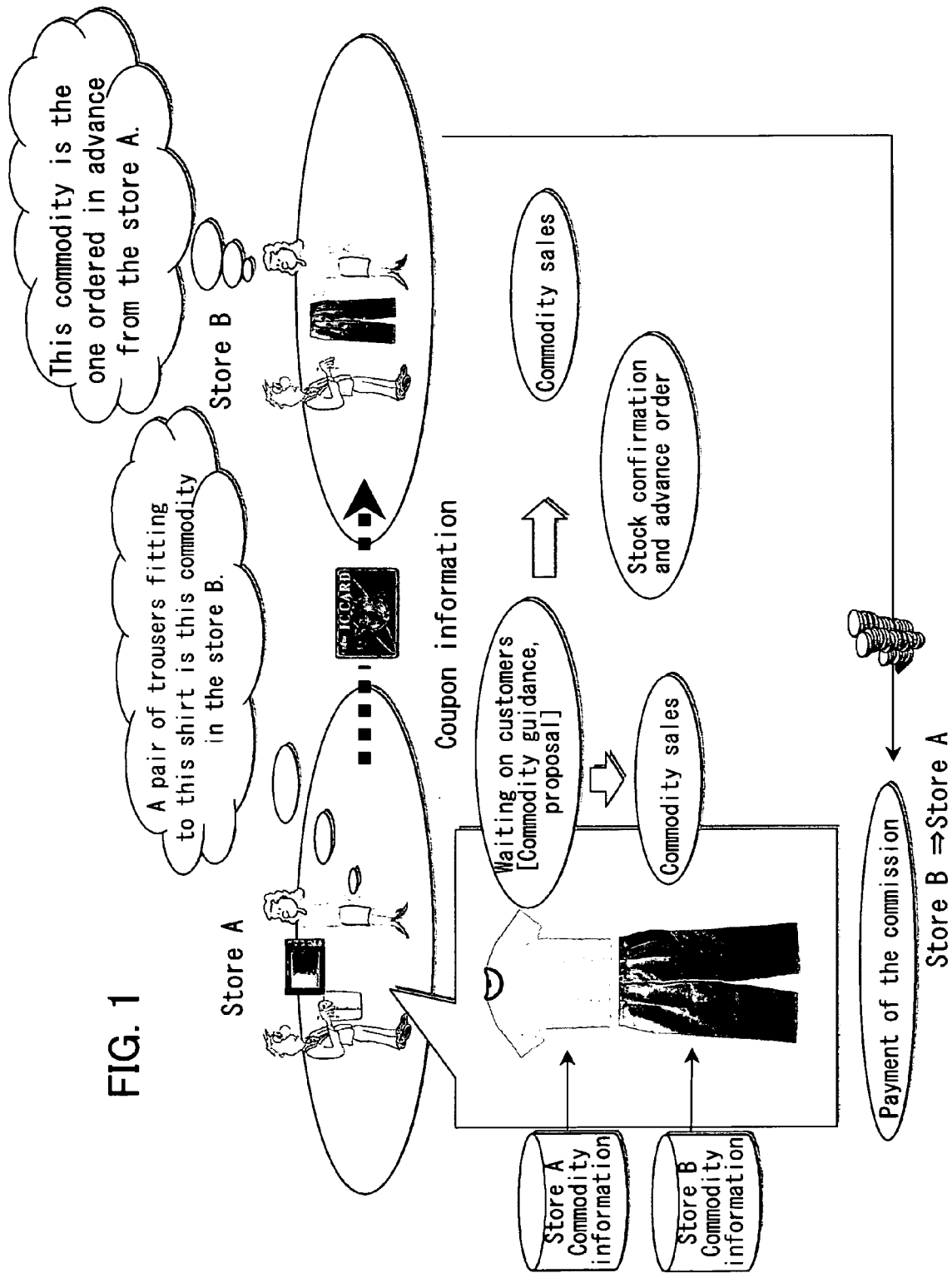
FIG. 1 shows a schematic explanation diagram of a commodity sales method according to the embodiment of the present invention.

FIG. 1 shows a schematic explanation diagram of a commodity sales system according to an embodiment of the present invention. In FIG. 1, in order to perform sales cooperation between a plurality of stores constituting, for example, a shopping center and a street of stores, a store clerk in each store offers, to a customer in the store, a proposal of coordinates in which a commodity in the store concerned (store A) is combined with a commodity in another store (store B). Based on this proposal, when the customer comes to the introduced store (store B), and purchases the commodity for sale in the other store (store B), a means is provided so that the original store (store A) can receive a sales commission from the introduced store. Further, preferably, the customer can purchase the commodity for sale in the other store at a predetermined discount price. In the following explanation, as an example, coordinates on commodities of clothes and fashion are described.

Figure 2:
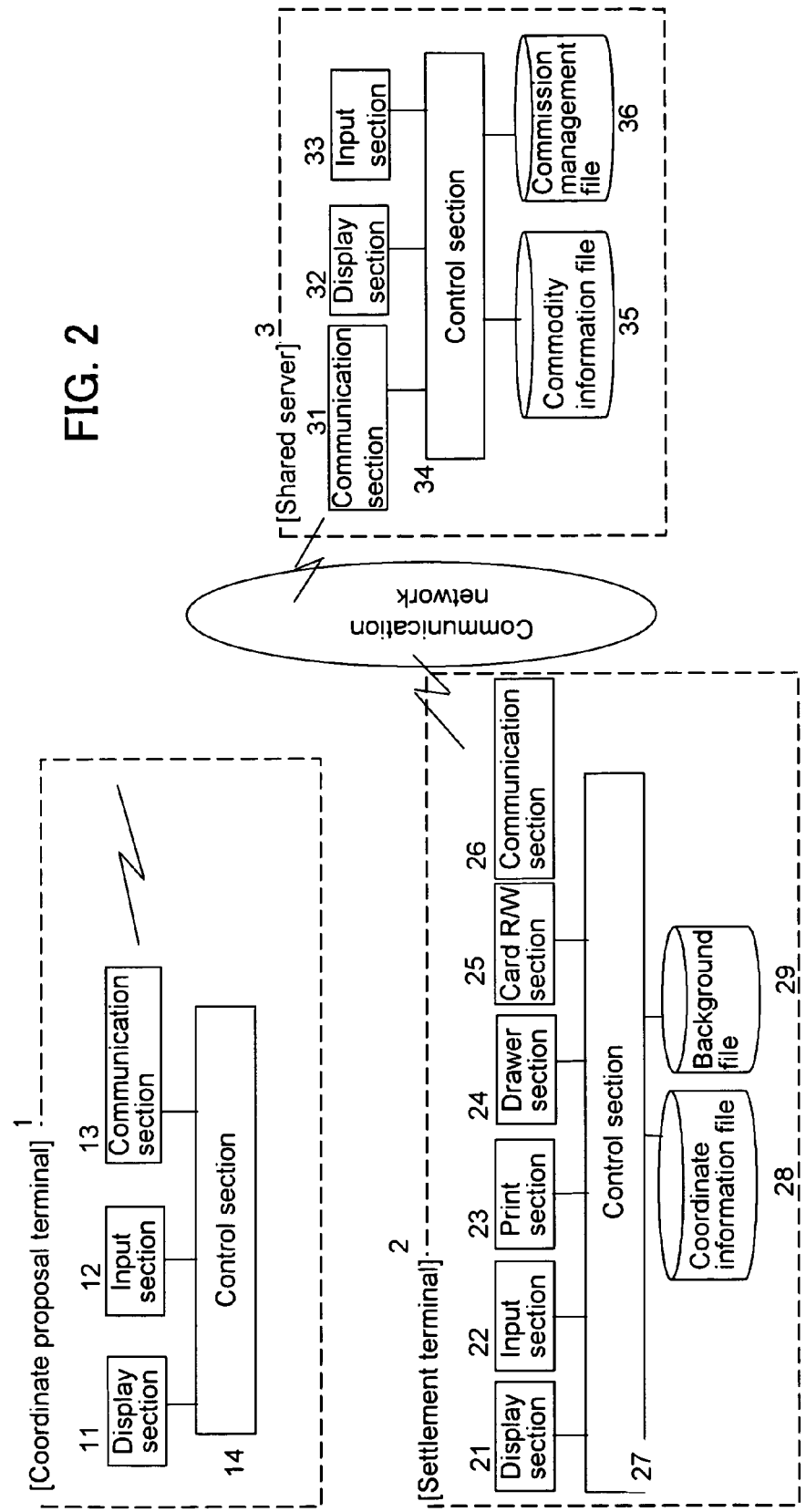
FIG. 2 shows a block diagram of a commodity sales system according to the embodiment of the present invention.

FIG. 2 shows a block diagram of a commodity sales system according to the embodiment of the present invention. In FIG. 2, the commodity sales system is constituted of a coordinate proposal terminal 1, a settlement terminal 2, and a server 3, which are interconnected with a communication network. Coordinate proposal terminal 1 is, for example, a portable terminal which can be carried by a store clerk. Coordinate proposal terminal 1 includes: a display section 11 such as a liquid crystal display; an input section 12 such as a ten key; a communication section 13 connecting to a communication network such as a wireless LAN; and a control section 14 executing processing peculiar to the embodiment of the present invention described later. Settlement terminal 2 is, for example, a POS (point of sales) terminal in a POS system implemented in the store. Settlement terminal 2 includes: a display section 21 such as a liquid crystal display; an input section 22 including a ten key; a print section 23 printing a receipt; a drawer section 24 storing cash; a card R/W section 25 performing read (R) and write (W) operation from/to a recording medium (magnetic stripe card, IC card, or the like) recording customer information, such as membership card issued by the shopping center, etc., credit card and cash card; a communication section 26; a control section 27 performing processing peculiar to the embodiment of the present invention described later; and further, a coordinate information file 28 and a background file 29.

Server 3 is a common server to each store constituting the shopping center, and includes display section 31, input section 32, communication section 33, control section 34, and further a commodity information file 35 and a commission management file 36 described later.

Here, coordinate proposal terminal 1 and settlement terminal 2 may be of separate structure as shown in FIG. 1, or may be structured integrally. Also, coordinate information file 28 and background file 29 may be stored either in coordinate proposal terminal 1, or in server 3.

FIG. 3 shows explanation diagrams of each file for use in the embodiment of the present invention. More specifically, as exemplary file contents, FIG. 3(a) shows background file 29, FIG. 3(b) shows coordinate information file 28, FIG. 3(c) shows commodity information file 35, and FIG. 3(d) shows commission management file 36, respectively.

Coordinate information file 28 shown in FIG. 3(b) is a database storing information related to commodities of other stores which are coordinated to each commodity dealt in the original store (hereafter such commodities are referred to as coordinate commodities). For example, coordinate information file 28 includes commodity number, commodity name, feature, image data, extraction keyword, cooperation store name, commodity number of the coordinate commodity, background image number, and so on. The coordinate commodities, which can be combined with respective commodities in the store concerned, are selected in advance by the store clerks of the store concerned, etc., and registered in the coordinate information file.

Commodity information file 35 shown in FIG. 3(c) is a database storing commodity information dealt in at least the stores in the sales cooperation, among the plurality of stores constituting the shopping center, etc. Commodity information file 35 includes commodity number, commodity name, feature, image link address, store name, sales price, discount rate, commission rate, stock condition, etc. for each commodity. Here, the discount rate is discount information to be applied when a customer purchases a coordinate commodity in the introduced store. Also, the commission rate is commission information to be paid from the introduced store to the original store, when the customer purchases a coordinate commodity introduced in the original store.

The discount information is not limited to the discount rate. The information may be a discount amount, or the like. Also, the commission information is not limited to the commission rate. Instead, a commission amount itself may be used.

Commission management file 36 shown in FIG. 3(d) stores information which is registered when a commodity of another store is introduced to a customer. For example, commission management file 36 includes the original store name, introduction number, introduced commodity number, introduction success flag, payment flag, sales commission, customer's membership number, and so on. The introduction number is a number issued when a certain store introduces a coordinate commodity to a customer which will be explained later. The introduction success flag is a flag for identifying whether the customer actually purchased the coordinate commodity introduced by the original store. The payment flag is a flag for identifying whether the sales commission has been paid from the introduced store to the original store.

Figure 4:
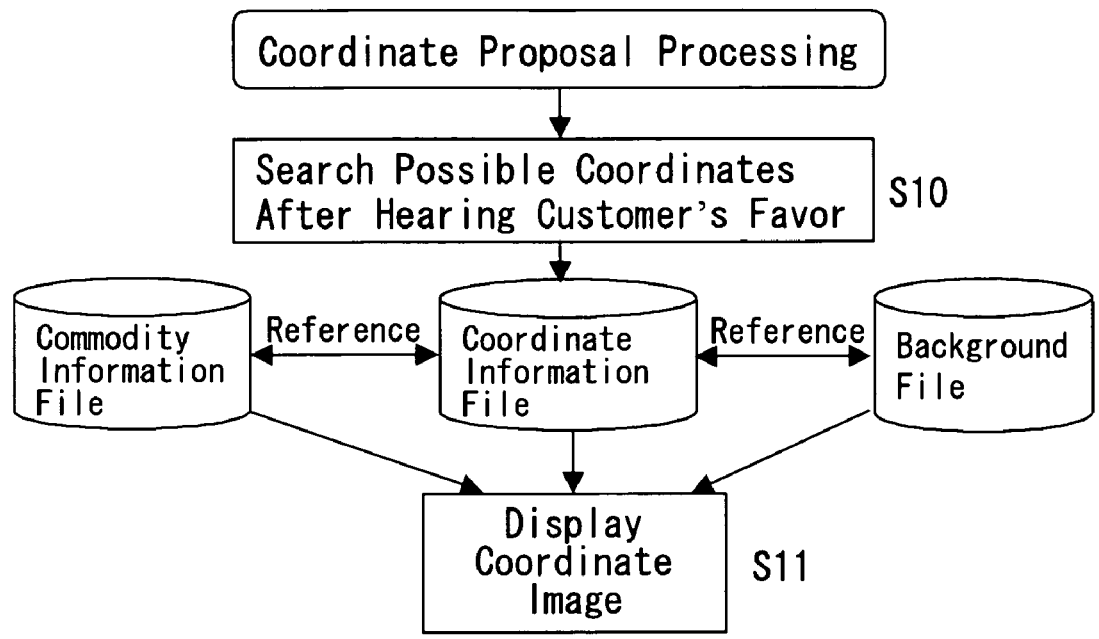
FIG. 4 shows a processing flowchart for a coordinate proposal terminal according to the embodiments of the present invention.

FIG. 4 shows a processing flowchart for the coordinate proposal terminal according to the embodiment of the present invention. In FIG. 4, the clerk proposes coordinate commodities, one commodity for sale in the original store and the other for sale in another store, during making dialog with the customer. More specifically, the clerk asks taste of the customer and searches some sets of coordinate commodities which the customer possibly likes, by operating coordinate proposal terminal 1 (S10). The clerk then displays images of the coordinate commodities in which the commodity for sale in the original store is combined with the commodity for sale in the other store (S11), and proposes the coordinate commodities to the customer. For example, the clerk inputs into coordinate proposal terminal 1 the commodity number, etc. of the commodity for sale in the original store selected by the customer (or the commodity in the original store proposed by the clerk.) Coordinate proposal terminal 1 acquires an image of the commodity of interest for sale in the store, by referring to coordinate information file 28 stored in settlement terminal 2, acquires the commodity number of the coordinate commodity (of the other store), corresponding to the commodity for sale in the original store, and further acquires, from commodity information file 35, the commodity information (such as commodity name, image, store name, and sales price) corresponding to the coordinate commodity for sale in the other store. Also, when a background image number has been set against the commodity for sale in the original store in coordinate information file 28, coordinate proposal terminal 1 acquires a background image corresponding to the background image number, from background file 29.

When the necessary information (including images) has been acquired, coordinate proposal terminal 1 displays a coordinate image, in which the images having been acquired are combined, onto display section 11. The display positions of these images may be settled by the clerk, or automatically determined depending on each kind of the commodities (for example, in case of a T-shirt, the image is displayed on the upper half of the display section, while in case of trousers, the image is displayed on the lower half of display section 11.)

Figure 5:
FIG. 5 shows an example of a coordinate image.

FIG. 5 is an example of the coordinate image, in which an exemplary combination of a T-shirt and trousers is illustrated. In this example, a background image is not set.

However, when the background image is set, the coordinate image is displayed upon the background image. By displaying the coordinate commodities together with the background, a customer can picture a concrete image of wearing the commodities, which increases an incentive of the customer to purchasing the commodities.

After looking at the coordinate image, when the customer indicates the will to purchase both the commodity for sale in the original store and the commodity for sale in the other store, ordinary sales processing is performed for the commodity of the original store, using settlement terminal 2.

Meanwhile, as for the commodity sold in the other store, the clerk operates settlement terminal 2 so as to perform the introduction processing described below. Similarly, when the customer indicates the will to purchase only the commodity for sale in the other store, the introduction processing described below is performed.

FIG. 6 shows a flowchart of the sales and introduction processing performed by use of settlement terminal 2. When the customer purchases the commodity for sale in the store, concerned, settlement terminal 2 performs ordinary sales processing (S20). On the other hand when the customer purchases the commodity for sale in the other store, the following introduction processing is started. Settlement terminal 2 acquires the membership number from the membership card owned by the customer, and acquires the commodity number of the commodity for sale in the other store input from the clerk. Settlement terminal 2 then refers to commodity information file 35 in server 3, and checks whether or not the commodity concerned is stocked (S21). In step S22, when the commodity is found stocked, settlement terminal 2 issues an introduction number (S23), and stores introduction information (including introduction number, commodity number, membership number, and flag information having an initial value '0'), a sales commission (having an initial value '0'), etc. into commission management file 36 (S24). Further, settlement terminal 2 acquires the commodity information related to the introduced commodity (store name, commodity name, discount rate, commission rate, etc.) from commodity information file 35 in server 3 (S25).

On acquiring the introduction number and the commodity information related to the introduced commodity, settlement terminal 2 generates coupon information including the commodity information (S26), and stores the coupon information into the membership card (S27). The coupon information includes, for example, introduction number, original store name, introduced store name, commodity name, commodity number, discount rate, commission rate, etc. Additionally, settlement terminal 2 may print out the coupon information (S28).

FIG. 7 shows an example of a receipt on which the coupon information is printed. FIG. 7 shows such a case that the customer receives an introduction of a commodity for sale in the other store, and that the customer purchases a commodity for sale in the original store. The coupon information is printed out on the receipt issued by the sales processing performed for the sold commodity of the original store. Only the coupon information may be printed on the receipt paper, in case that the commodity for sale in the original store is not purchased, and that only the introduction of the commodity for sale in the other store is performed.

Thereafter, the clerk returns the membership card to the customer and hands the receipt to the customer when the receipt has been issued.

Next, the customer comes to the introduced store, and preferably after confirming the real commodity which has been introduced from the original store, the customer indicate the will to purchase the commodity concerned.

Figure 8:
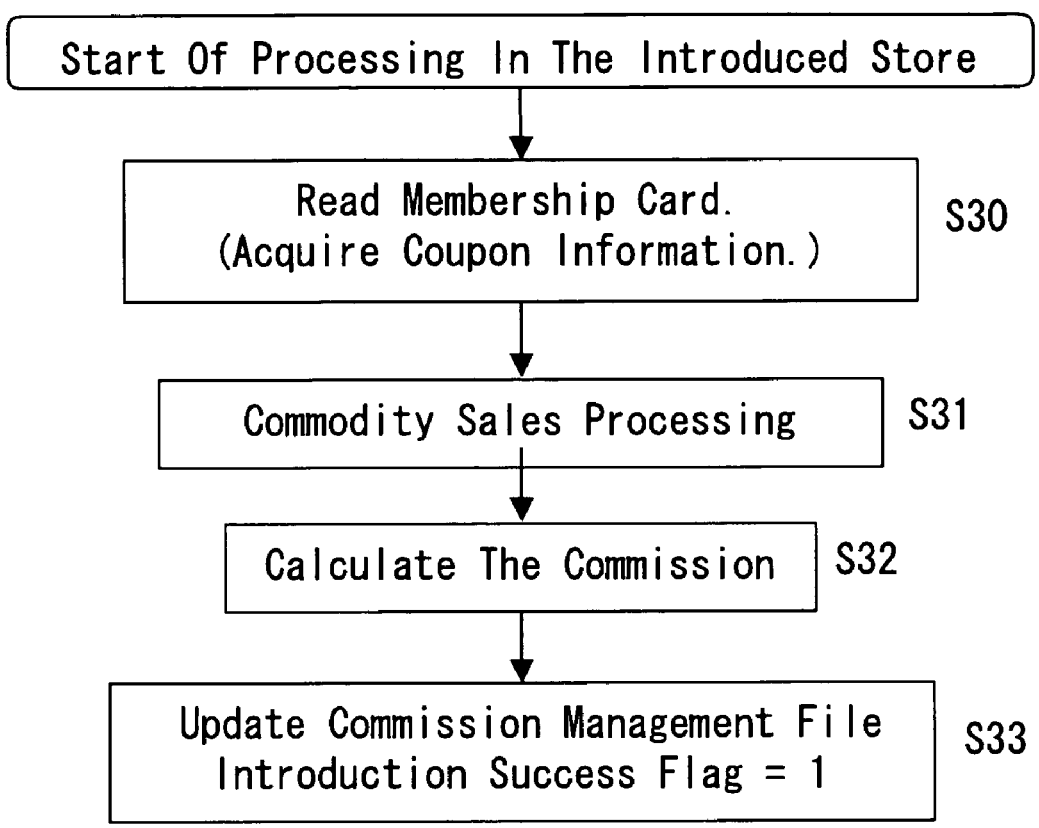
FIG. 8 shows a sales processing flowchart using a settlement terminal 2 of the store introduced.

FIG. 8 shows a sales processing flowchart using settlement terminal 2 provided in the introduced store. The clerk of the introduced store receives the membership card from the customer, and the membership card is read in by card R/W section 25 of settlement terminal 2. Settlement terminal 2 acquires the coupon information recorded in the membership card (S30).

Settlement terminal 2 performs the sales processing for the commodity according to the coupon information (S31). At this time, settlement terminal 2 executes the settlement with the customer applying the discount rate included in the coupon information. Further, settlement terminal 2 calculates the sales commission to be paid to the original store, based on the commission rate included in the coupon information (S32). After the sales processing, settlement terminal 2 notifies server 3 about the introduction number, the commodity sales success and the sales commission, as sales notification. Server 3 updates commission management file 36 based on the sales notification (S33). Namely, server 3 sets '1' into the introduction success flag corresponding to the introduction number, and writes the sales commission.

Here, when the commission rate is not included in the coupon information, settlement terminal 2 may calculate the sales commission referring to the commodity information file. Or, calculation of the sales commission may be performed by server 3, referring to the commodity information file.

Server 3 periodically executes commission payment processing with regard to the sales commission having been registered in the commission management file.

Figure 9:
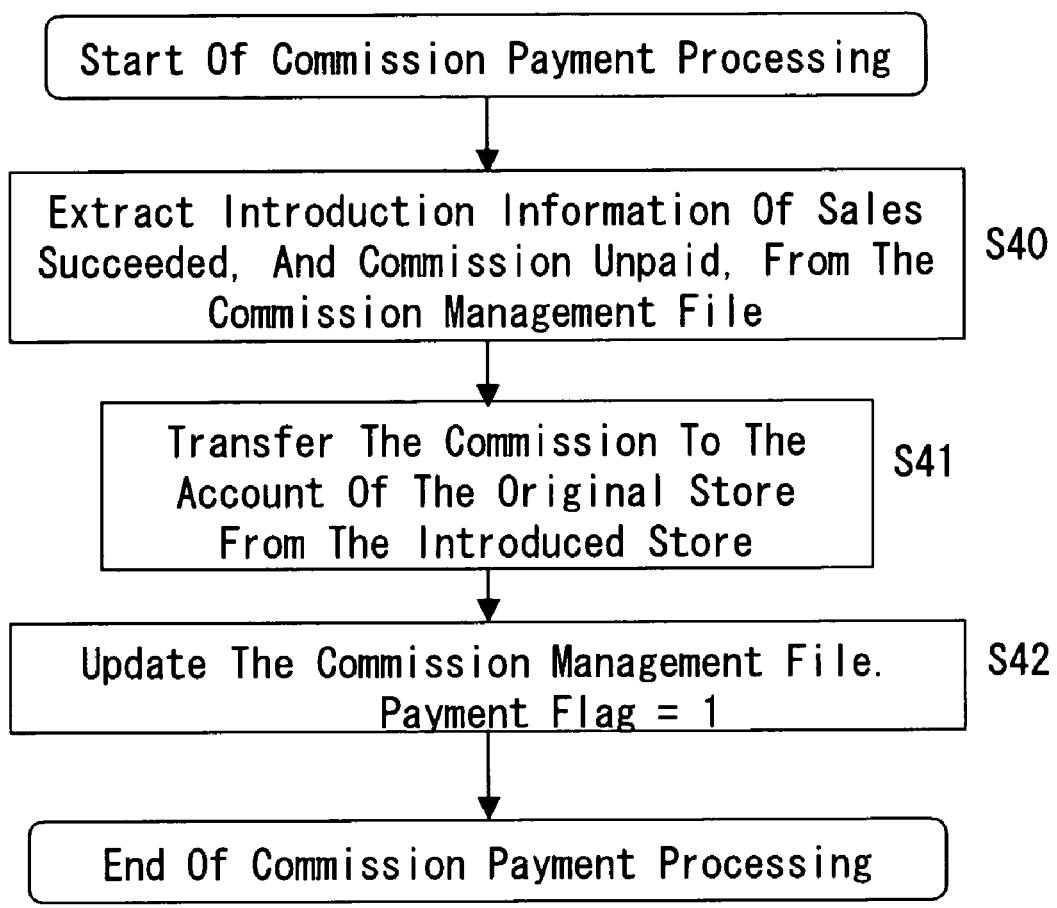
FIG. 9 shows a flowchart of commission payment processing performed by a server.

FIG. 9 shows a flowchart of the commission payment processing. In FIG. 9, server 3 periodically searches in commission management file 36, and extracts introduction information in which the introduction success flag is '1' (sales succeeded) and the payment flag is '0' (unpaid) (S40). Based on the extracted introduction information, server 3 executes transfer of the sales commission having been registered in the introduction information, from the account of the introduced store to the account of the original store (S41). For example, server 3 requests a host computer, which is provided in a banking institution connected through a network, for executing transfer processing. Server 3 sets '1' into the payment flag in the introduction information of commission management file 36, on completion of the transfer processing (S42). In such a way, by managing the sales commission using the server provided commonly to the plurality of stores, the commission collection to be received by the original store from the introduced store is performed automatically.

As such, according to the embodiment of the present invention, for example, in a store selling clothes only, customers can obtain a more concrete image of wearing by receiving proposals of coordinate patterns combined with shoes, necklace, caps, etc. which are not for sale in the store concerned but for sale in other stores. This raises the custome's will to purchase, and results in commodity sales increase in the store concerned. Also, when customers purchase commodities in an introduced store according to an introduction received from the original store, the original store concerned can receive sales commissions.

As for the introduced store, the sales amount can also be increased, because the commodities in this store may be introduced by other stores, and accordingly, advertisement opportunity to the customers is substantially increased. Also, because the customers come to the introduced store with the will to purchase a commodity from the first, the clerk in the introduced store can receive the customers efficiently.

From the viewpoint of a customer, receiving a coordinate proposal is helpful to the customer when considering coordinates. Further, the customer can purchase a coordinate commodity at a discount price.

INDUSTRIAL APPLICANILITY

As the present invention has been described, according to the invention, it becomes possible to propose to a customer a commodity of a store in combination with a commodity of another store. Accordingly, variation of proposals with regard to the commodities for sale in the original store can be increased, and therefore, sales increase of the commodity in the original store can be expected. In addition, because the commodities of the store concerned are introduced to customers in other stores, additional sales increase of the commodities for sale in the store concerned can be expected. When the store introduces a commodity which is for sale in another store, and the customer purchases the commodity according to this introduction, the original store can receive a sales commission from the introduced store. As such, by mutually introducing commodities among the stores, each store can expect sales increase and obtain a synergy effect.

The scope of protection of the present invention is not limited to the embodiment described above. Instead, all inventions and equivalents described in the appended claims are included in the scope of protection.

What is claimed is:

1. A commodity sales system managing at least a commodity for sale in a first store and a commodity for sale in a second store, and comprising:
    a product coordination database storing at least coordination information associating a first commodity for sale in the first store with a second commodity for sale in the second store; and
    a first terminal at the first store for introducing both the first commodity and the second commodity to a customer in the first store, where after the first commodity is selected the second commodity is identified for the introducing based on the first commodity and the coordination information associating the first commodity with the second commodity
    wherein the first terminal displays a coordination image corresponding to the coordination information, including an image of the first commodity combined with an image of the second commodity.

2. The commodity sales system according to claim 1, wherein the coordination information comprises background information, and the first terminal displays the coordination image on a background image corresponding to the background information.

3. The commodity sales system according to claim 1, wherein the first terminal records coupon information available when the customer purchases, in the second store, the second commodity introduced by the first store, into a predetermined recording medium.

4. The commodity sales system according to claim 3, wherein the coupon information comprises discount information of the second commodity.

5. The commodity sales system according to claim 1, further comprising:
    a second terminal which reads the coupon information recorded in the recording medium, and executes sales processing for the second commodity according to said coupon information.

6. The commodity sales system according to claim 5, further comprising:
    a commission management apparatus which receives, from the second terminal, a sales notification indicative of the sales processing according to the coupon information when the second terminal executes the sales processing for the second commodity according to the coupon information, and executes commission payment processing to be paid from the second store to the first store, based on said sales notification.

7. The commodity sales system according to claim 6, wherein the second terminal acquires an amount of the sales commission based on predetermined commission information included in the coupon information, and notifies the commission management apparatus of the sales commission together with the sales notification.

8. The commodity sales system according to claim 6, further comprising:
    a commodity database storing commodity information of at least the second commodity, including a sales commission to be paid from the second store to the first store, when the customer purchases the second commodity in the second store based on the introduction by the first store,
    wherein, on receipt of the sales notification, the commission management apparatus acquires the sales commission referring to the commodity database.

9. The commodity sales system according to claim 1, wherein the first terminal outputs a form on which the coupon information is printed.

10. The commodity sales system according to claim 9, wherein, when the customer purchases the first commodity in the first store, the first terminal executes sales processing for the first commodity.

11. The commodity sales system according to claim 9, wherein the first terminal prints out the coupon information on a receipt corresponding to the sales processing for the first commodity.

12. A commodity sales system managing at least a commodity for sale in a first store and a commodity for sale in a second store, and comprising:
    a coordination database storing at least coordination information of a first commodity for sale in the first store combined with a second commodity for sale in the second store;
    a first terminal for introducing both the first commodity and the second commodity to a customer in the first store, based on the coordination information stored in the coordination database; and
    a commodity database storing commodity information of at least the second commodity, including discount information applied when the customer purchases the second commodity based on the introduction by the first store,
    wherein the first terminal records coupon information available when the customer purchases, in the second store, the second commodity introduced by the first store, into a predetermined recording medium,
    wherein the coupon information comprises discount information of the second commodity, and
    wherein the first terminal generates the coupon information referring to said commodity database.

13. A method of electronic inter-store referral of commodities, comprising:
- at an original store, receiving human-inputted electronic information identifying a first commodity selected by a customer or clerk and offered for sale at the original store;
- using the human-inputted electronic information identifying the first commodity to automatically identify, from among commodities offered at different stores, a second commodity offered for sale in an introduced store;
- at the original store, electronically displaying information about the identified second commodity; and
- at the original store, causing generation of a record indicating that the original store has referred the customer to the introduced store,
- wherein the first and second commodities are products designed to be worn by customers, and where the displaying comprises displaying a depiction of the first commodity together with the second commodity.

14. A method according to claim 13, further comprising using the record to provide a discount to the customer when the customer purchases the second commodity at the introduced store.

15. A method according to claim 13, further comprising using the record to provide a reward to the original store when the customer purchases the second commodity at the introduced store.

* * * * *